(12) United States Patent
Fitzpatrick

(10) Patent No.: US 9,150,322 B2
(45) Date of Patent: Oct. 6, 2015

(54) BAG HOLDER

(76) Inventor: Mark Bernard Fitzpatrick, Cobourg (CA)

( * ) Notice: Subject to any disclaimer, the term of this patent is extended or adjusted under 35 U.S.C. 154(b) by 959 days.

(21) Appl. No.: 12/444,318

(22) PCT Filed: Oct. 6, 2006

(86) PCT No.: PCT/CA2006/001643
§ 371 (c)(1),
(2), (4) Date: Apr. 3, 2009

(87) PCT Pub. No.: WO2008/040110
PCT Pub. Date: Apr. 10, 2008

(65) Prior Publication Data
US 2010/0006713 A1    Jan. 14, 2010

(51) Int. Cl.
*B65B 67/04* (2006.01)
*B65B 67/12* (2006.01)

(52) U.S. Cl.
CPC ..................................... *B65B 67/12* (2013.01)

(58) Field of Classification Search
CPC ..................................................... B65B 67/12
USPC ............ 248/200, 300, 94–101, 247; 220/481, 220/482; 24/460, 462, 30.5 R, 30.5 L
See application file for complete search history.

(56) References Cited

U.S. PATENT DOCUMENTS

| 285,908 | A | | 10/1883 | Ludington |
| 3,091,422 | A | | 5/1963 | Hobbs |
| 3,162,414 | A | * | 12/1964 | Maschek ........................ 248/101 |
| 3,188,031 | A | | 6/1965 | Fournier |
| 3,412,965 | A | | 11/1968 | Alexander |
| 3,468,505 | A | | 9/1969 | Reilly |
| 3,653,619 | A | | 4/1972 | Plum |
| 3,684,225 | A | | 8/1972 | Crawford et al. |
| 3,707,271 | A | * | 12/1972 | Sanchez et al. ................ 248/101 |
| 3,773,286 | A | | 11/1973 | Govoni et al. |
| 3,870,261 | A | | 3/1975 | McSwain |
| 4,223,858 | A | | 9/1980 | de Salazar |
| D257,993 | S | | 1/1981 | DeMars |
| D262,688 | S | | 1/1982 | Nilsson |
| 4,669,690 | A | * | 6/1987 | McEniry ........................ 248/101 |
| D300,972 | S | | 5/1989 | Streno |
| D310,745 | S | | 9/1990 | Cross |
| 4,998,695 | A | | 3/1991 | Nobis |
| D322,389 | S | | 12/1991 | Harmon |

(Continued)

OTHER PUBLICATIONS

Examination Report (Article 94(3) EPC) dated Jan. 19, 2011, issued on Corresponding European Patent Application No. 06804630.9.

(Continued)

*Primary Examiner* — Kimberly Wood
(74) *Attorney, Agent, or Firm* — Perry + Currier Inc.; Dolly Kao

(57) ABSTRACT

A novel bag holder is provided. In an embodiment, the bag holder includes a retaining bar that is shaped like a rectangular box. The bag holder also includes a wall bracket having a channel portion complementary to the shape of said retaining bar. The wall bracket can be mounted to vertical surface such as a wall. A portion of the rim of a plastic bag can be rolled around the retaining bar. Then, the retaining bar with the bag can be inserted into channel portion thereby securing the bag and facilitating the depositing and withdrawal of articles from the bag opening.

14 Claims, 4 Drawing Sheets

(56) References Cited

U.S. PATENT DOCUMENTS

| | | |
|---|---|---|
| 5,088,667 A | 2/1992 | Olson |
| 5,267,711 A | 12/1993 | Perreault |
| 5,524,762 A | 6/1996 | Shafran et al. |
| D376,737 S | 12/1996 | Hecker |
| D426,041 S | 5/2000 | Boghossian |
| D474,968 S | 5/2003 | Hicks et al. |
| D479,683 S | 9/2003 | Turvey et al. |
| 7,080,756 B2 | 7/2006 | Cunningham |
| D546,610 S | 7/2007 | Blanchard |
| D659,513 S | 5/2012 | Lin |
| 2002/0087573 A1 | 7/2002 | Reuning et al. |

OTHER PUBLICATIONS

Extended European Search Report dated Jul. 5, 2010, issued on Corresponding European Patent Application No. 06804630.9.

International Preliminary Report on Patentability, dated Apr. 7, 2009, issued on Counterpart PCT Patent Application No. PCT/CA2006/001643.

\* cited by examiner

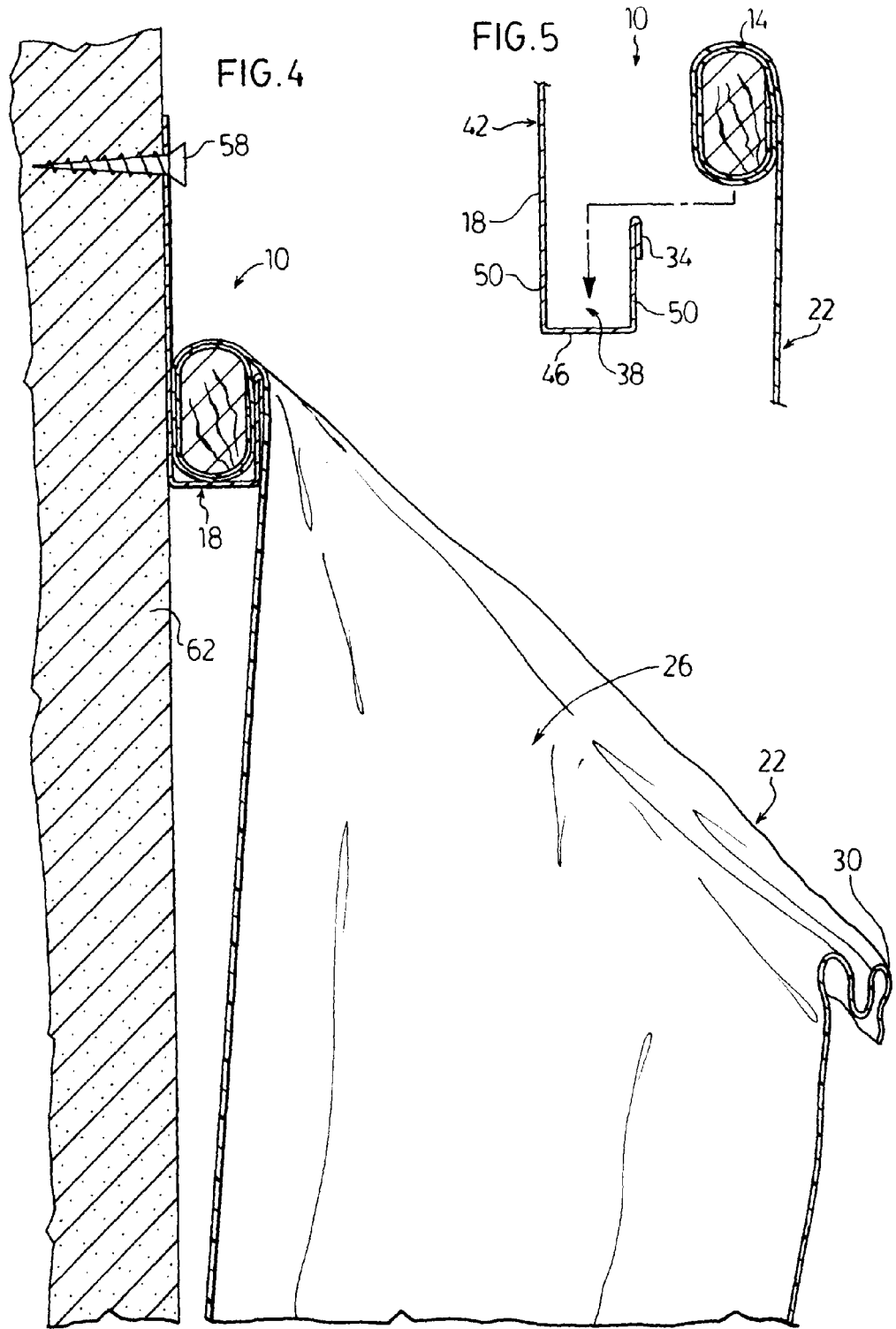

BAG HOLDER

FIELD OF THE INVENTION

The present invention relates to flexible containers such as bags and more particularly relates to a holder for bags.

BACKGROUND OF THE INVENTION

Plastic bags are an example of a commonly employed container. Plastic bags are inexpensive and extremely convenient. They can be stored in large quantities in a relatively small space, and can be used to hold or carry a significant volume of material.

Large plastic bags are often used for a variety of articles, including garbage, recycling, lawn clippings, leaves, and linens. Whatever the purpose, when the bag is in use it is necessary to have the opening of the bag retained in a substantially open position so that articles can be put into, or removed from the bag. Anyone who has performed lawn care will recall the frustration of trying to keep the bag open while also trying to push leaves or lawn clippings into the bag.

It is therefore known to provide apparatuses that will hold the bag, and hold the bag in the open position so that a person can deposit articles into the bag without having to hold the bag open by him. For example, U.S. Pat. No. 5,088,667 to Olsen discloses a trash bag holding and spreading device in the form of a unitary one-piece holder. The holder includes a pair of retainer halves, each of which has a respective internal face, a first adjoining edge that adjoin one another and a second remote edge. The holder can be used to both carry the bag and to hang the bag. The holder in Olsen, however, employs a complex set of retaining clips and tabs that are used to pinch the bag. This results in complex construction and, perhaps more significantly, a relatively small portion of the surface area of the bag is held within the clips and tabs, which could limit the amount of weight that the bag holder can maintain without resulting in tearing to the bag itself. Also such retaining clips and tabs are, over time, subject to wear and tear and breakage.

As another example, U.S. Pat. No. 4,998, 694 to Barteaux discloses a bag holder for supporting a conventional plastic grocery bag in an open position for use as a waste receptacle. Barteaux is thus limited to grocery bags and is not generally suitable for other types of bags such as garbage bags.

U.S. Pat. No. 4,705,249 to Edwards discloses a trash bag holding device for holding a spreading the open end of a thin walled plastic trash bag that includes a pair of cooperating elongated spreader bar members one of which is adapted to be mounted on a supporting wall in outwardly spaced parallel relation to the wall and other of which is adapted to be releasably mounted to the first. Edwards has similar limitations to Olson, in that complex moulds are required to manufacture the device, and the clamping mechanism only retains a relatively small surface area of the bag. Also, the means of attaching the spread bar members to each other also involves detents and tabs so that the members can be snapped together. Edwards can thus be difficult to operate, and/or could result in breakage of the spreader bar members over time. Similar problems can be found the holders described in U.S. Pat. No. 3,561,077 to Grant, and U.S. Pat. No. 3,091,422 to Hobbs.

SUMMARY OF THE INVENTION

An aspect of the invention provides a bag holder comprising a retaining bar that is shaped substantially like a rectangular box and having a first length. The retaining bar is configured so that a portion of a rim of a bag can be rolled around the retaining bar. The bag holder also comprises a mounting bracket having a channel portion having a second length substantially the same as the first length. The channel portion is complementary to the retaining bar such that the retaining bar is removably receivable within the channel portion. The channel portion is configured to prevent (or at least substantially reduce) the retaining bar from rolling within the channel portion when retaining bar is inserted within the channel portion. When the portion of the rim is rolled around the retaining bar and the retaining bar is inserted into the channel portion, the mounting bracket supports the bag.

The retaining bar can be made from wood, and the mounting bracket can be made from sheet metal.

The channel portion can be resiliently deformable such that during insertion of the retaining bar in the channel portion, the channel portion is urged outwardly and when the retaining bar is inserted into the channel portion, the channel portion biases inwardly to secure the retaining bar and the portion of the rim of the bag within the channel portion.

The channel portion can include a rounded lip to reduce tearing of the bag.

The retaining bar can be characterized by a depth and a width when viewed from the end thereof. The channel portion can include a trough that is substantially corresponding in dimensions to the width of the retaining bar. The channel portion likewise can include a front wall that terminates in a lip. The front wall of the channel portion can be shorter than the depth of the retaining bar, such that when the portion of the rim of the bag is rolled around the retaining bar, the weight of the bag is distributed along an upper surface of the retaining bar and thereby reduces contact between the bag and the lip and thereby reduces the likelihood of the lip tearing the bag.

The mounting bracket can include a mounting portion above the channel portion for securing the mounting bracket to a vertical surface.

The mounting portion can include a pair of holes at opposite ends thereof for receiving screws therethrough.

Another aspect of the invention provides a mounting bracket for a bag holder that includes a retaining bar. The retaining bar is shaped substantially like a rectangular box and has a first length. The retaining bar is configured so that a portion of a rim of a bag can be rolled therearound. The mounting bracket comprises a channel portion having a second length substantially the same as the first length. The channel portion is complementary to the retaining bar such that the retaining bar is removably receivable within the channel portion. The channel portion is configured to prevent the retaining bar from rolling within the channel portion when retaining bar is inserted within the channel portion. When the portion of the rim is rolled around the retaining bar and the retaining bar is inserted into the channel portion the retaining bar supports the bag.

A novel bag holder is provided. In an embodiment, the bag holder includes a retaining bar that is shaped like a rectangular box. The bag holder also includes a wall bracket having a channel portion complementary to the shape of the retaining bar. The wall bracket can be mounted to vertical surface such as a wall. A portion of the rim of a plastic bag can be rolled around the retaining bar. Then, the retaining bar with the bag can be inserted into channel portion thereby securing the bag and facilitating the depositing and withdrawal of articles from the bag opening.

BRIEF DESCRIPTION OF THE DRAWINGS

The present invention will now be discussed, by way of example only, in relation to the attached Figures in which:

FIG. 4 is a side view of the bag holder of FIG. 3; and,

FIG. 5 shows the bag holder of FIG. 4 with the retaining bar removed from the wall bracket.

DETAILED DESCRIPTION OF THE EMBODIMENTS

Figure 1:
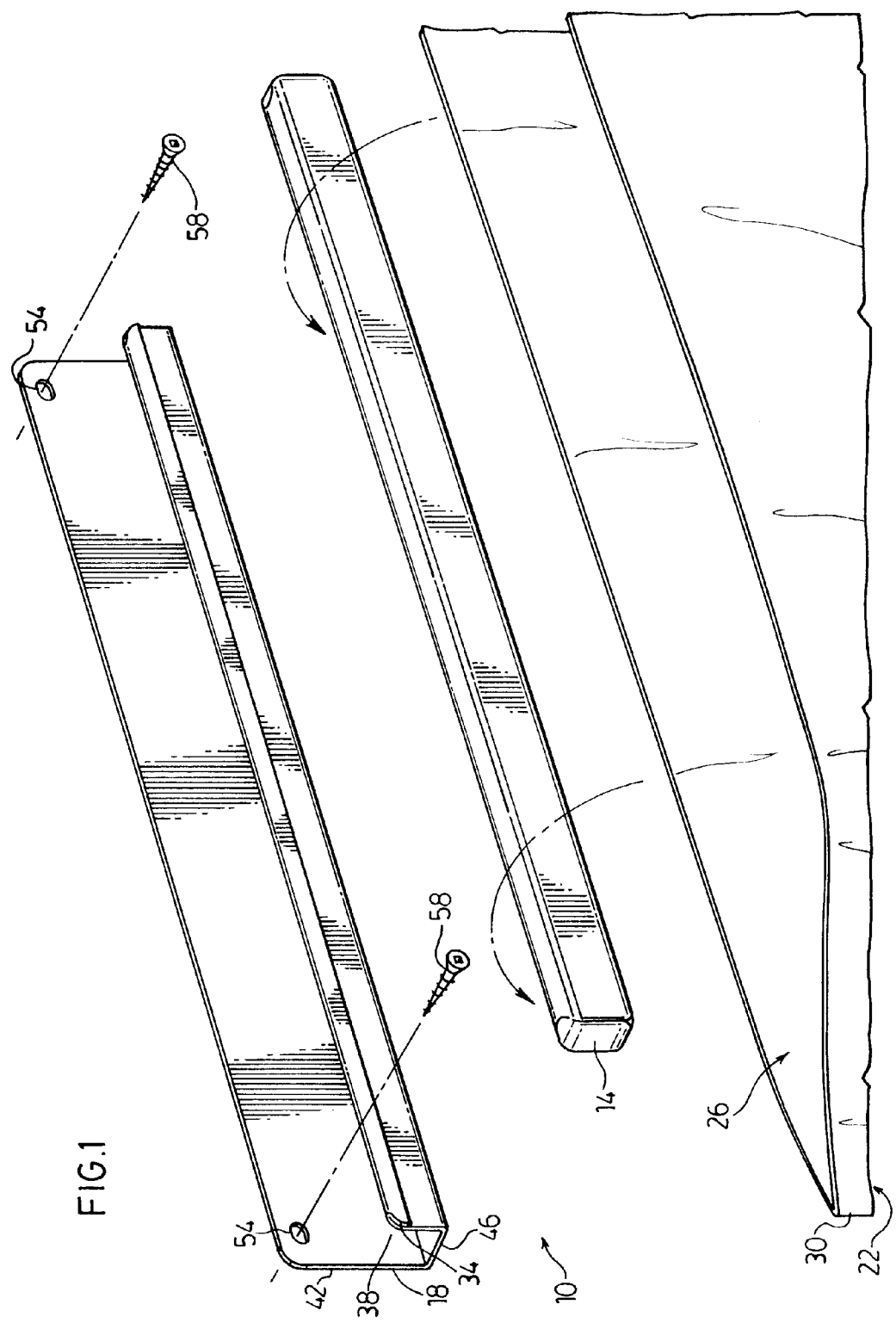
FIG. 1 is an exploded isometric view of a bag holder in accordance with an embodiment of the invention.

Referring now to FIG. 1-5, a bag holder in accordance with an embodiment of the invention is indicated generally at 10. Bag holder 10 comprises a retaining bar 14 and a wall bracket 18 which can cooperate to hold a bag 22 having an opening 26 defined by a rim 30. Bag 22 is made from a flexible material. Bag 22 is thus typically a conventional plastic bag, such as a plastic garbage bag or the like.

Retaining bar 14 is shaped like a rectangular box, with a length that is substantially the same as the diameter of bag 22.

As best seen in FIGS. 2-5, retaining bar 14 is adapted so that a portion of rim 30 can be rolled around the length of retaining bar 14. The number of times that rim 30 is rolled around bar 14 is not particularly limited. Generally, the greater the number of turns, the greater the amount of weight that can be supported in bag 22 when bag 22 is held by bar 14, without bag 22 tearing along the portion of bag 22 proximal to bar 14. The greater the number of turns can also reduce the amount of usable volume in bag 22. However, it is in this manner that one of the advantages of the present advantages is provided, in that holder 10 can be easily adapted by the user according to a desired retaining strength and/or usable volume for bag 22. Retaining bar 14 is typically made from wood, but can be made from any material that is desired, including a rigid plastic. In any event, retaining bar 14 is typically rigid, and the surface of bar 14 is generally smooth to the touch of the user, but still provides a degree of friction so that rim 30 will not slip once it is wrapped around bar 14. As best seen in FIGS. 4 and 5, when viewed from the end retaining bar 14 is substantially rectangular, but in a present embodiment each corner of the rectangle is somewhat rounded and is therefore characterized by a radius. The degree to which each corner is rounded is selected so as to feel smooth to the touch, without the feeling that bar 14 is cutting into the hand. However, the corners are not so rounded so much that rim 30 simply slips off, or rolls off of bar 14.

Wall bracket 18 is substantially the same length as retaining bar 14. When viewed from the end, as seen in FIGS. 4 and 5, wall bracket 18 is substantially J-shaped. Wall bracket 18 is typically bent into shape from sheet metal, and is provided with a crimped lip 34. Lip 34 thus presents a smooth, dull edge that will not cut (or substantially reduces the likelihood of such) either bag 30 or the hand of the user.

As best seen in FIG. 5, bracket 18 thus includes a channel portion 38 and a mounting portion 42. Channel portion 38 is complementary in dimensions to retaining bar 14. The trough 46 of channel portion 38 is thus shorter than the walls 50 of channel portion 38. As best seen in FIG. 4, the length of trough 46 and the depth of walls 50 are thus chosen to be longer to prevent rotation of bar 14 within channel portion 38 and therefore prevent bag 30 from slipping when retaining bar 14 is placed within channel portion 38. However, as best seen in FIG. 4, the depth of retaining bar 14 is chosen to be greater than the wall 50 having lip 34, so that the upper surface of retaining bar 14 distributes the weight of bag 22 therealong and reduces the amount of contact between bag 22 and lip 34, and thereby further reduces the likelihood of the tearing of bag 22.

The gauge of sheet metal for wall bracket 18 is chosen so that walls 50 are resiliently bendable. Likewise, the actual length of trough 46 is chosen so that when rim 30 of bag 22 is wrapped around bar 14, one or both of walls 50 can be urged outwardly so that retaining bar 14 can be inserted completely within channel portion 38. However, once retaining bar 14 is secured within channel portion 38, walls 50 are inwardly biased so as to secure bar 14 and the rim of bag 30 within channel portion 38. It should now be understood that other types of material, other than sheet metal, can be used for wall bracket 18.

As best seen in FIGS. 1-4, mounting portion 42 of wall bracket 18 includes a pair of holes 54, with one hole at each end of mounting portion 42. Each hole 54, in turn, is designed to receive a fastener such as a screw 58, so that mounting portion 42 can be secured to a wall 62 or other vertical surface. While mounting portion 42 utilizes a pair of screws, it should be understood that more screws can be used, and/or other fastening means can be employed, such as glue or other adhesive.

Figure 2:
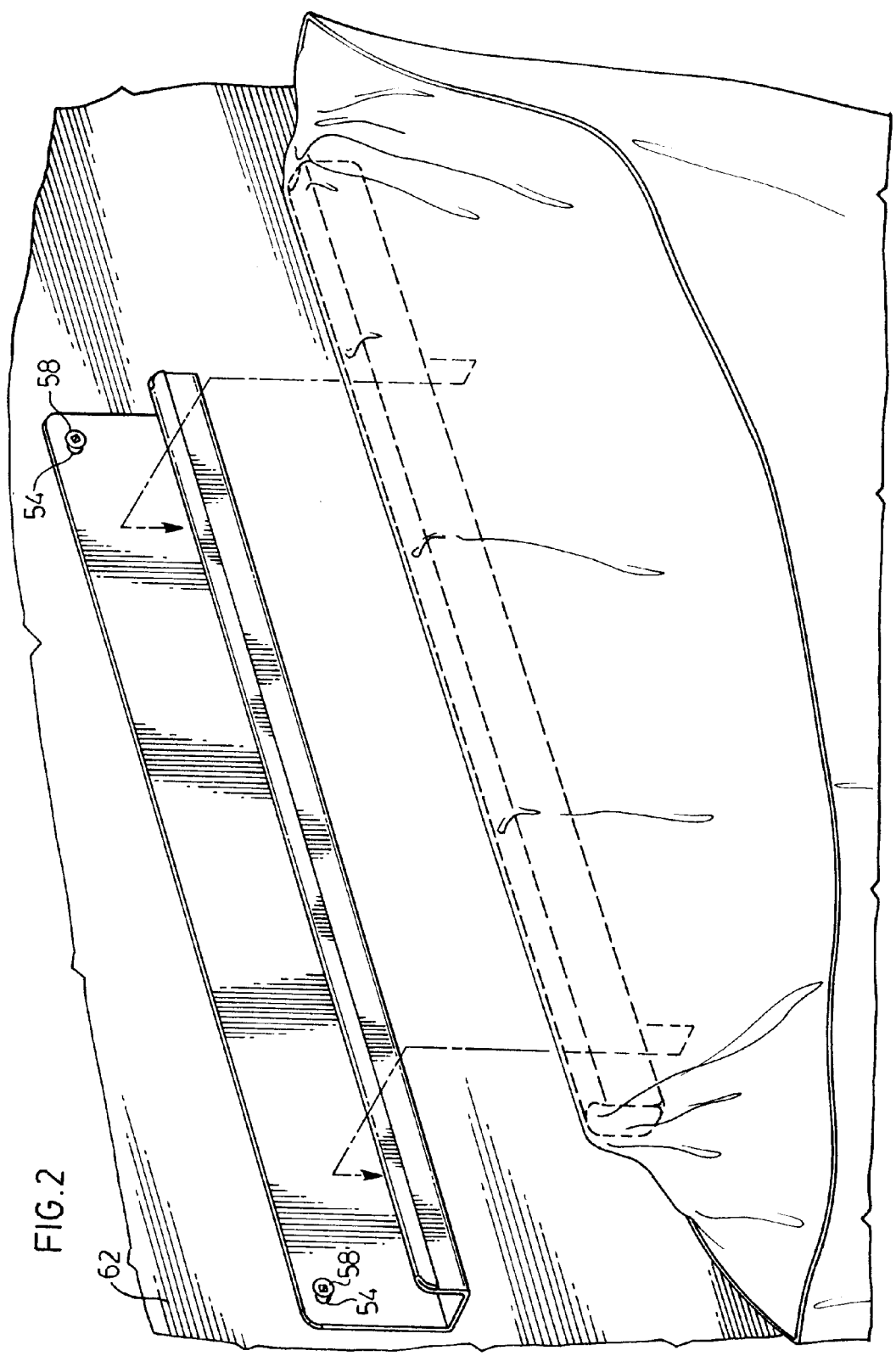
FIG. 2 shows the bag holder of FIG. 1 with a bag attached to the retaining bar of the bag holder.
Figure 3:
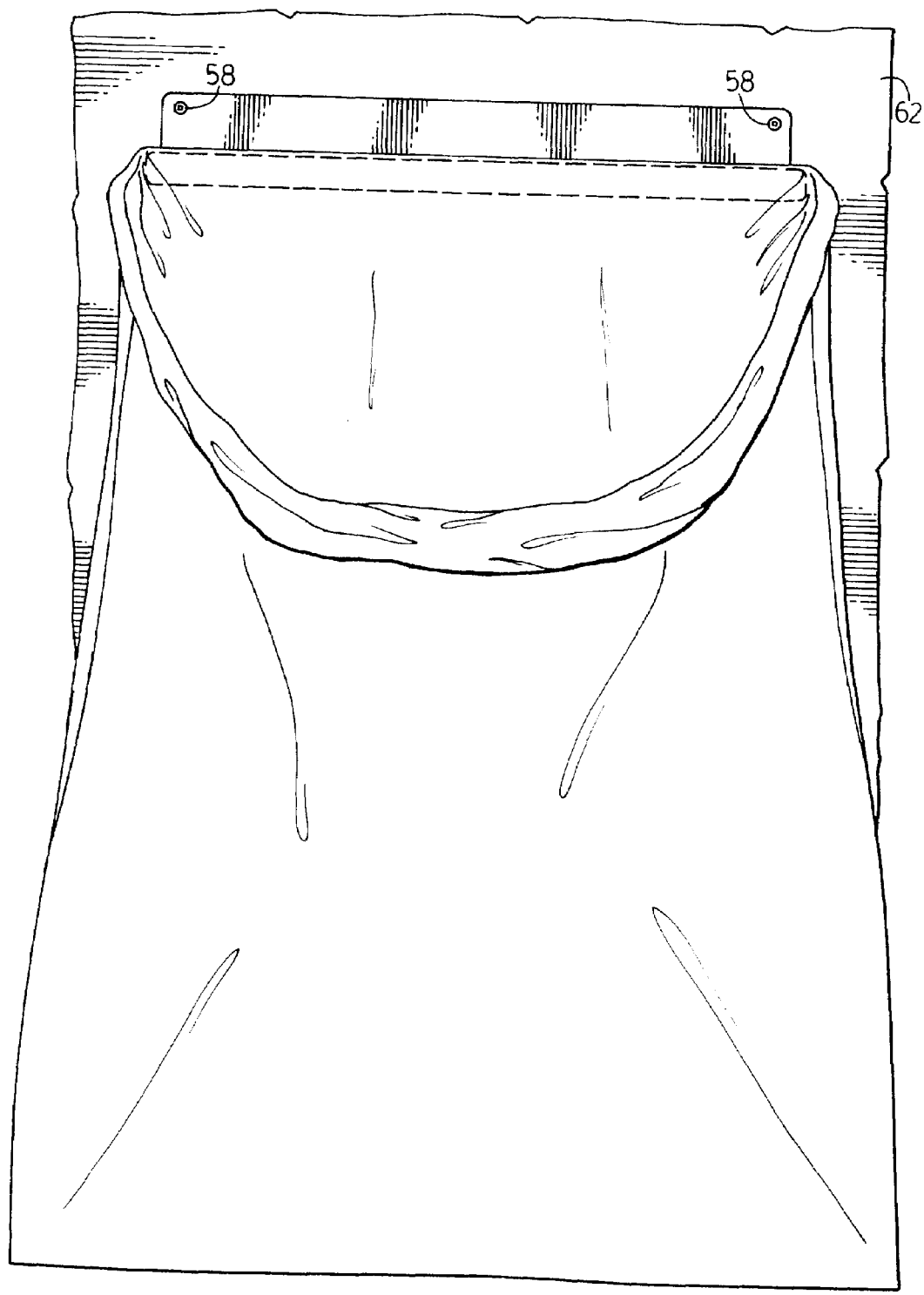
FIG. 3 is a front view of the bag holder of FIG. 1 with the retaining bar mounted in the wall bracket.

In use, the user will mount wall bracket 18 to a vertical surface such as wall 62 in a desired location. The user will typically ensure wall bracket 18 is horizontal and mounted to a surface that can hold the weight of the articles to be deposited into bag 22. The wall bracket 18 is typically (though need not be) mounted at a height that is greater than or equal to the height of bag 30. As best seen in FIGS. 2 and 5, a user will open the rim of bag 30 and wrap rim 30 of bag 30 around retaining bar 14 a desired number of times. As discussed earlier, the user can wrap rim 30 a greater number of times to provide greater strength and allow more weight to be deposited into bag 30 while reducing the risk of bag 30 tearing along rim 22. Next, as best seen in FIGS. 3 and 4, retaining bar 14 is completely inserted into the channel portion 38 so that the corners of retaining bar rest within the corners of channel portion 38.

As shown in FIG. 4, at this the opening 26 of point bag 22 is now hanging downwards and the user can deposit articles into bag 22 via opening 26. If needed, the user can use one hand to pull the portion of rim 22 that is not being secured by retaining bar 14 away from wall 62 so as to increase the area of opening 26 and thereby facilitate the insertion of articles into bag 22.

While the foregoing describes certain embodiments, it is to be understood that such embodiments are exemplary and that variations, combinations and subsets of those embodiments are contemplated. For example, mounting portion 42 of wall bracket 18 can be substituted for other configurations. For example, wall bracket 18 can be incorporated into a free standing structure, such as a collapsible frame. As another example, wall bracket 18 could be built into the upper surface of a ladder or step ladder, so that the ladder could be used with a retaining bar 14 to hold a bag. As a still further example, wall bracket 18 can be modified to include hanging clips on mounting portion 42 (either in addition to or in lieu of holes 54) so that bracket 18 can be hung over a vertical structure, such as the top of a fence, or a door, or a cupboard door, so that in substance bracket 18 would be mounted by hanging.

As another example, it should be understood that while the embodiments herein discuss a garbage bag 22, the bag need not be plastic and need not be for garbage. For example, the teachings herein are also suitable for a cloth laundry bag.

It should also be understood that the length of wall bracket 18 and retaining bar 14 are not particularly limited and can be set according to the size of the bag to be held and/or according to the space in which the bag holder is to be located—e.g. on the inside of a cupboard door.

The invention claimed is:

1. A bag holder comprising:
a retaining bar being shaped substantially like a rectangular box and having a first length; said retaining bar being rollable about a longitudinal axis of said retaining bar so that a portion of a rim of a bag can be rolled concurrently with said retaining bar to wrap said portion of said rim of said bag around said retaining bar;
a mounting bracket having a channel portion having a second length substantially the same as said first length; said channel portion being complementary to said retaining bar such that said retaining bar is removably receivable within said channel portion; said channel portion configured to prevent said retaining bar from rolling within said channel portion when said retaining bar is inserted within said channel portion, a such that when said portion of said rim is rolled concurrently with said retaining bar to wrap said portion of said rim of said bag around said retaining bar and said retaining bar is inserted into said channel portion, said mounting bracket supports said bag,
wherein said retaining bar includes a depth and a width when viewed from an end thereof; said channel portion including a trough substantially corresponding to said width and a front wall terminating in a lip; said front wall being shorter than said depth, such that when said portion of said rim of said bag is rolled concurrently with said retaining bar to wrap said portion of said rim of said bag around said retaining bar, a weight of said bag is distributed along an upper surface of said retaining bar to reduce contact between said bag and said lip.

2. The bag holder of claim 1 wherein said retaining bar is made from wood.

3. The bag holder of claim 1 wherein said mounting bracket is made from sheet metal.

4. The bag holder of claim 1 wherein said channel portion is resiliently deformable such that during insertion of said retaining bar in said channel portion, said channel portion is urged outwardly and when said retaining bar is inserted into said channel portion said channel portion biases inwardly to secure said retaining bar and said portion of said rim of said bag within said channel portion.

5. The bag holder of claim 1 wherein channel portion includes a rounded lip to reduce tearing of said bag.

6. The bag holder of claim 1 wherein said mounting bracket includes a mounting portion above said channel portion for securing said mounting bracket to a vertical surface.

7. The bag holder of claim 6 wherein said mounting portion includes a pair of holes at opposite ends thereof for receiving screws therethrough.

8. A mounting bracket for a bag holder that includes a retaining bar being shaped substantially like a rectangular box and having a first length; said retaining bar rollable about a longitudinal axis of said retaining bar so that a portion of a rim of a bag can be rolled concurrently with said retaining bar to wrap said portion of said rim of said bag around said retaining bar; said mounting bracket comprising:
a channel portion having a second length substantially the same as said first length; said channel portion being complementary to said retaining bar such that said retaining bar is removably receivable within said channel portion; said channel portion configured to prevent said retaining bar from rolling within said channel portion when said retaining bar is inserted within said channel portion;
such that when said portion of said rim is rolled concurrently with said retaining bar to wrap said portion of said rim of said bag around said retaining bar and said retaining bar is inserted into said channel portion, said retaining bar supports said bag,
wherein said retaining bar includes a depth and a width when viewed from an end thereof; said channel portion including a trough substantially corresponding to said width and a front wall terminating in a lip; said front wall being shorter than said depth, such that when said portion of said rim of said bag is rolled concurrently with said retaining bar to wrap said portion of said rim of said bag around said retaining bar, a weight of said bag is distributed along an upper surface of said retaining bar to reduce contact between said bag and said lip.

9. The mounting bracket of claim 8 wherein said retaining bar is made from wood.

10. The mounting bracket of claim 8 wherein said mounting bracket is made from sheet metal.

11. The mounting bracket of claim 8 wherein said channel portion is resiliently deformable such that during insertion of said retaining bar in said channel portion, said channel portion is urged outwardly and when said retaining bar is inserted into said channel portion said channel portion biases inwardly to secure said retaining bar and said portion of said rim of said bag within said channel portion.

12. The mounting bracket of claim 8 wherein said channel portion includes a rounded lip to reduce tearing of said bag when said bag contacts said rounded lip.

13. The mounting bracket of claim 8 further including a mounting portion above said channel portion for securing said mounting bracket to a vertical surface.

14. The mounting bracket of claim 13 wherein said mounting portion includes a pair of holes at opposite ends thereof for receiving screws therethrough.

* * * * *